BEST AVAILABLE COPY BEST AVAILABLE COPY

A. H. KNAPP & G. W. BAILEY.

BAILEY Assignor to KNAPP.

CURTAIN-FIXTURES.

No. 7,307. Reissued Sept. 12, 1876.

WITNESSES

E. M. Gallaher.

D. P. Lowe

By

INVENTOR

A. Hayden Knapp,
George W. Bailey,
J. S. Brown,
Attorney

N. PETERS, PHOTO-LITHOGRAPHER, WASHINGTON, D. C.

BEST AVAILABLE COPY

UNITED STATES PATENT OFFICE.

A. HAYDN KNAPP, OF NEWTON, AND GEORGE W. BAILEY, OF LAWRENCE, MASSACHUSETTS; SAID BAILEY ASSIGNOR TO SAID KNAPP.

IMPROVEMENT IN CURTAIN-FIXTURES.

Specification forming part of Letters Patent No. 102,409, dated April 26, 1870; reissue No. 7,307, dated September 12, 1876; application filed May 23, 1876.

DIVISION A.

*To all whom it may concern:*

Be it known that A. HAYDN KNAPP, of Newton, in the county of Middlesex, and GEORGE W. BAILEY, of Lawrence, in the county of Essex, in the State of Massachusetts, have invented certain Improvements in Curtain-Fixtures; and I do hereby declare that the following is a full and exact description thereof, reference being had to the accompanying drawings, making part of this specification—

Figure 1:
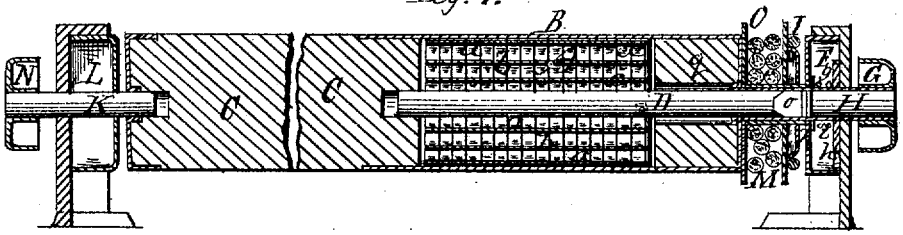
Figure 2:
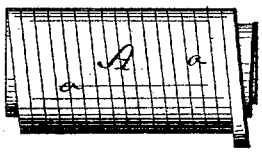
Figure 3:
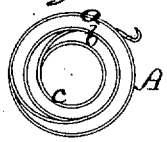

Figure 1 being a central longitudinal section of a curtain roller and spindle provided with the improved spring, which is the basis of the present invention, the section being taken in a horizontal plane; Fig. 2, a side view of the improved spring detached; Fig. 3, an end view of the spring.

Like letters designate corresponding parts in all of the figures.

The object of this invention is to produce a spring-balance curtain-fixture, with the spring in a case or chamber at one end, or forming a continuation of the curtain-roller, and occupying as little length as practicable, so as not to interfere with the nailing of the curtain or shade to the roller, (the same as if it were entirely of solid wood,) and, at the same time, to secure sufficient length of spring to dispense with gearing. This purpose is accomplished by means of an improved spring, A, formed of redoubled series of spirals or coils, concentric, or one within another.

Each of the concentric series *a b c* of spirals or coils, one within another, is formed of as many turns of the wire or ribbon of which it is made as may be required, and there are as many of the concentric series of the spirals or coils as the diameter of the inclosing case or chamber of the roller may admit or the requirement of the spring indicate. The successive series of spirals or coils are connected first at one end and then at the other end of the spring.

It is obvious that in effect this spring is equivalent to a spring of a single spiral series as long as all of these concentric spiral series together; and hence by this construction the spring is enabled to be shortened as many times as there are concentric series of spirals or coils. Thus with three series of spirals, as shown, only one-third the length is occupied that would be required in a single spiral series. Practically, more than three concentric spiral series may be used, and a spring not exceeding three or four inches in length may suffice for any ordinary curtain-fixture, whereas the single spiral spring, as commonly constructed, is required to be some twenty inches long.

It is found to be a further improvement on the spring to make it of a flat steel ribbon, spiral springs usually being made of round wire. This ribbon is wound flatwise, as shown, and thereby it is enabled to occupy so little space with each spiral series as to admit a larger number of them in the same diameter of case or chamber than if made of round wire. Also, by using the flat spring, one-half less length is found to be needed, it having a larger range of flexibility and elasticity, without giving, than the round-wire spring, and, by making it of steel, it can be tempered more uniformly than wire can be drawn, especially if of brass.

One great advantage of the concentric-series spiral spring is that it can be adapted to varying weights of curtains and shades. A light shade, requiring a less rapid change in the strength of the spring as it winds up or unwinds, needs a longer spring, of a given strength, than a heavy shade. These concentric springs may all be made alike, long enough for the lightest shades, and then may be adjusted and adapted to heavier shades by cutting off one or more of the concentric series of spirals, the length of the spring remaining unchanged. But the compactness of the connected coil-series or concentric-spiral series spring is its great excellency.

The ordinary single spiral spring occupies most of the length of the curtain-roller, which it is desirable to make of wood, the greatly varying widths of windows rendering it necessary to cut the roller in most cases, which, with metallic rollers, cannot conveniently be done by the people at large. Besides, the cur-

BEST AVAILABLE COPY tain or shade cannot be tacked to the metallic roller. But with the improved spring herein described the solid wooden roller C occupies most of the width of the window, being free to be cut off at one end to suit the width of the window, and the case or chamber B does not interfere with the ordinary tacking on of the shade, especially if a short wooden block or solid part, *q*, is secured to the outer end of the case or chamber, as shown in Fig. 1, so that the contiguous corner of the shade can be tacked thereon.

What I claim as the invention of A. HAYDN KNAPP and GEORGE W. BAILEY, and desire to secure by Letters Patent, is—

1. In a curtain-roller, provided with a chamber at one end, an actuating spring having successive series of coils located one within another, substantially as herein specified.

2. In combination with the spindle of a curtain-roller, a flat-wire spiral spring, having two or more series of coils redoubled one upon another, substantially as herein specified.

A. HAYDN KNAPP.

Witnesses:
H. W. KITTRIDGE,
A. KELLEY.